United States Patent
Spurling

(10) Patent No.: US 10,562,386 B2
(45) Date of Patent: Feb. 18, 2020

(54) MOTOR VEHICLE HAVING REDUCED ENGINE MOVEMENT CAUSED BY COLLISION

(71) Applicant: FORD GLOBAL TECHNOLOGIES, LLC, Dearborn, MI (US)

(72) Inventor: Michael Spurling, Romford (GB)

(73) Assignee: Ford Global Technologies, LLC, Dearborn, MI (US)

(*) Notice: Subject to any disclaimer, the term of this patent is extended or adjusted under 35 U.S.C. 154(b) by 177 days.

(21) Appl. No.: 15/902,320

(22) Filed: Feb. 22, 2018

(65) Prior Publication Data
US 2018/0257472 A1    Sep. 13, 2018

(30) Foreign Application Priority Data
Mar. 13, 2017   (GB) .................... 1703959.5

(51) Int. Cl.
*B60K 5/12*   (2006.01)
*B62D 21/15*  (2006.01)
(Continued)

(52) U.S. Cl.
CPC .......... *B60K 5/1275* (2013.01); *B62D 21/155* (2013.01); *B62D 25/082* (2013.01); *B60K 5/04* (2013.01); *B60Y 2306/01* (2013.01)

(58) Field of Classification Search
CPC ...... B60K 5/1275; B60K 5/04; B60K 5/1216; B60K 5/12; B60K 5/00; B62D 21/155;
(Continued)

(56) References Cited

U.S. PATENT DOCUMENTS

| 5,213,179 A | 5/1993 | Goor |
| 5,335,745 A * | 8/1994 | Goor .................. B60K 5/00 180/232 |

(Continued)

FOREIGN PATENT DOCUMENTS

| DE | 4313785 A1 | 11/1994 |
| DE | 19915279 A1 | 10/2000 |

(Continued)

OTHER PUBLICATIONS

European Patent Office, Search Report for the corresponding European Patent Application No. 18153382.9 dated Oct. 8, 2018.
(Continued)

*Primary Examiner* — Drew J Brown
(74) *Attorney, Agent, or Firm* — Frank A. MacKenzie; Brooks Kushman P.C.

(57) ABSTRACT

A motor vehicle includes an engine assembly housed in a bay, a subframe adjacent a bottom of the bay, a bulkhead adjacent a rear of the bay, and a catch structure extending laterally across the bay above the subframe and adjacent an upper end of the bulkhead. A lower catch hook is coupled to the engine assembly and configured to engage the subframe and transfer load from the engine assembly to the subframe when the engine assembly moves toward the bulkhead during a collision. An upper catch hook is coupled to the engine assembly and configured to engage the catch structure and transfer load from the engine assembly to the catch structure when the engine assembly moves toward the bulkhead during the collision. The catch structure may be a cable connected to left and right suspension towers.

20 Claims, 4 Drawing Sheets

(51) Int. Cl.
  *B62D 25/08* (2006.01)
  *B60K 5/04* (2006.01)

(58) Field of Classification Search
  CPC .... B62D 25/082; B62D 21/09; B62D 21/152; B60Y 2306/01
  See application file for complete search history.

(56) References Cited

U.S. PATENT DOCUMENTS

| | | | |
|---|---|---|---|
| 5,337,852 A | 8/1994 | Kastner | |
| 2002/0096384 A1* | 7/2002 | Yoshida | B60K 5/12 180/298 |
| 2013/0270862 A1* | 10/2013 | Hotta | B62D 21/155 296/187.09 |
| 2015/0028626 A1 | 1/2015 | Gopal | |
| 2016/0131020 A1* | 5/2016 | Bui | B60K 11/08 180/68.1 |
| 2017/0320523 A1* | 11/2017 | Schnug | B62D 21/152 |
| 2019/0072151 A1* | 3/2019 | Kim | B60K 5/1208 |

FOREIGN PATENT DOCUMENTS

| | | |
|---|---|---|
| DE | 10060393 A1 | 6/2002 |
| DE | 102009007267 A1 | 10/2009 |
| DE | 102009049873 A1 | 4/2011 |
| DE | 102010027386 A1 | 4/2011 |
| FR | 2972414 A1 | 9/2012 |
| FR | 2976251 A1 | 12/2012 |
| FR | 3031950 A1 | 7/2016 |

OTHER PUBLICATIONS

GB Search and Examination Report for GB 1703959.5 dated Aug. 22, 2017, 5 pages.

* cited by examiner

MOTOR VEHICLE HAVING REDUCED ENGINE MOVEMENT CAUSED BY COLLISION

CROSS-REFERENCE TO RELATED APPLICATIONS

This application claims foreign priority benefits under 35 U.S.C. § 119(a)-(d) to GB Application 1703959.5 filed Mar. 13, 2017, which is hereby incorporated by reference in its entirety.

TECHNICAL FIELD

The present disclosure relates to an engine assembly and surrounding structure for a motor vehicle configured to limit the penetration of the engine assembly into an interior of the motor vehicle during a collision.

BACKGROUND

With reference to FIG. 1, a vehicle 2 (as generally known in the prior art) comprises an engine assembly 10, provided within an engine compartment 4 of the vehicle, and a bulkhead structure 6 such as a dash panel. The bulkhead structure 6 may separate the engine compartment 4 from an interior 8 of the vehicle 2.

The engine assembly 10 comprises an engine 12 and a transmission (not shown). The engine assembly 10 is coupled to and supported by an engine support (not shown). Furthermore, a subframe 16 forms a structural member of the vehicle configured to support a suspension component (not shown) of the vehicle.

The vehicle 2 further comprises a crash structure 9, provided at an end of the vehicle, e.g. at the front of the vehicle, and configured to crumple during a collision of the vehicle in order to absorb and dissipate kinetic energy of the vehicle and decelerate the vehicle.

With reference to FIG. 2, when the previously proposed vehicle is involved in a collision, e.g. a frontal collision, after the crash structure 9 has crumpled, a force applied to the vehicle during the collision may act on the engine 12. The engine support may buckle or crumple during the collision as the vehicle decelerates. As the engine support buckles or crumples, the engine 12 may be displaced rearwards, towards the bulkhead structure 6.

As depicted in FIG. 2, when the engine 12 is displaced rearwards it may ride over the subframe 16. In some collisions, the engine 12 may be displaced such that it impacts the bulkhead structure 6. In this case the bulkhead structure 6 may be deformed such that the engine 12 penetrates into the interior 8 of the vehicle.

FIG. 3 shows the position of the engine 12 of the vehicle before and after the collision. In FIG. 3, the position of the engine before the collision is shown as a solid line and the position after the collision is shown as a dashed line. As depicted, during the collision, the force acting on the engine 12 may rotate the engine, e.g. about a lateral axis of the motor vehicle. Rotation of the engine may increase the extent of penetration of the engine 12 into the interior 8.

SUMMARY

According to an aspect of the present disclosure, there is provided a motor vehicle comprising: an engine assembly; a subframe; a catch structure; a first engine catch hook coupled to the engine assembly, wherein the first engine catch hook comprises a hook portion configured to engage the subframe of the motor vehicle during a collision and transfer crash load from the engine assembly to the subframe; and a second engine catch hook coupled to the engine assembly, wherein the second engine catch hook comprises a hook portion vertically spaced apart from the hook portion of the first engine catch hook and configured to engage the catch structure during the collision and transfer crash load from the engine into the catch structure, wherein the catch structure is at an upper end of a bulkhead structure between an engine bay and an interior of the vehicle.

Due to the hook portions of the first and second engine catch hooks being vertically spaced apart from each another, rotation of the engine assembly about a lateral axis of the engine assembly may be limited during the collision, e.g. prior to deformation of the catch structure and/or decoupling of the subframe.

The engine assembly may comprise a plurality of first and/or second engine catch hooks. The first engine catch hooks may be spaced apart, e.g. laterally spaced apart, from one another. Similarly, the second engine catch hooks may be spaced apart, e.g. laterally spaced apart, from one another. Due to the first and/or second engine catch hooks being laterally spaced apart, rotation of the engine assembly about a vertical axis of the engine assembly may be limited during the collision.

The catch structure may be configured to deform during the collision, e.g. under the load from the engine assembly, from a first state, in which the transfer of load from the engine assembly into the catch structure may limit movement of the engine assembly relative to the bulkhead structure, to a second state, in which the transfer of load from the engine assembly into the catch structure may be reduced.

The catch structure may be configured such that load is no longer transferred to the support structure from the second engine catch hook once the catch structure has deformed. Once the catch structure has deformed to the second state, the engine assembly may be permitted to move relative to the bulkhead. The catch structure may be configured to deform at a particular point during the collision in order to encourage movement of the engine assembly at the particular point during the collision, e.g. in order to effect a crash deceleration profile of the vehicle.

The catch structure may be coupled to a support structure of the vehicle. For example, the catch structure may be coupled to suspension towers of the vehicle. The second engine catch hook and optionally the catch structure may be configured to transfer load applied to the engine assembly during the collision to the support structure of the vehicle. Transferring the load, e.g. a load applied to the vehicle by the object or structure the vehicle is colliding with, to the support structure may reduce the velocity of the vehicle.

The subframe may be coupled to the support structure or another support structure within a support structure assembly of the vehicle. The first engine catch hook and optionally the subframe may be configured to transfer load applied to the engine assembly during the collision to the support structure of the vehicle.

The second engine catch hook and optionally the catch structure may be configured to increase the stiffness of the assembly, e.g. the stiffness of connections between the engine assembly and the support structure of the vehicle. In other words, the second engine catch hook and/or catch structure may be configured to increase the transfer of load from the engine assembly to the support structure of the vehicle. For example, the second engine catch hook and/or the catch structure may have a greater stiffness than an engine support configured to support the engine assembly relative to the support structure when the engine catch hooks are not engaged with the subframe and the catch structure respectively. The stiffness of the connections may be increased prior to deformation of the catch structure, e.g. once the second engine catch hooks have engaged with the catch structure.

The first and second engine catch hooks, and optionally the catch structure, are configured to limit movement, e.g. translation and/or rotation, of the engine assembly relative to the bulkhead structure during the collision, e.g. prior to the catch structure being deformed.

The catch structure may be configured to begin deforming when deceleration of the motor vehicle exceeds a threshold value.

The catch structure may be configured to decouple (yield, break, e.g. snap or rupture) from the support structure during the collision. After the catch structure has broken or decoupled, the catch structure may no longer transfer load from the engine assembly to the support structure. The catch structure may no longer limit movement of the engine assembly relative to the support structure after the catch structure breaks or becomes decoupled.

The subframe may be configured to decouple from the support structure during the collision. The subframe may be configured to decouple from the support structure, when a load applied to the subframe exceeds a threshold value.

The assembly may be configured such that the first engine catch hook applies a load, e.g. a load greater than the threshold value, to the subframe during the collision to decouple the subframe from a support structure.

The catch structure may be configured to break or decouple from a support structure at substantially the same time as, or after, the subframe decouples from the support structure.

The subframe and/or the catch structure may be configured such that decoupling of the subframe and/or deforming of the catch structure reduces a maximum deceleration of the vehicle during the collision.

The catch structure may comprise a cable coupled to a support structure of the vehicle at each end of the cable. For example, the cable may be coupled to suspension towers of the vehicle. The cable may extend across the vehicle in a lateral direction of the vehicle. The second engine catch hook may be configured to engage the cable during the collision.

The cable may be configured to snap during the collision, e.g. under the load applied to the cable by the second engine catch hook. Alternatively, the cable may be configured to decouple from the support structure at one or more ends of the cable. In other words, deformation of the catch structure may snap the cable or detach the cable from the support structure.

The catch structure may be configured to deform, e.g. break or decouple, when a load transferred from the engine reaches a threshold value.

The first and second engine catch hooks may be configured to engage the subframe and the catch structure respectively when the engine assembly is displaced towards the bulkhead structure of the vehicle, e.g. during the collision.

The catch structure may be spaced apart, e.g. axially spaced apart, from the bulkhead structure. The catch structure may be arranged such that the second engine catch hook engages the catch structure prior to the engine assembly contacting the bulkhead structure. The catch structure may be configured to deform from the first state to the second stage before the engine assembly contacts the bulkhead structure. For example, the catch structure may break or decouple from the support structure prior to the engine assembly contacting the bulkhead structure.

The catch structure may be configured to deform from the first state to the second state before the velocity of the motor vehicle reduces below a threshold value. For example, before the vehicle comes to a stop, e.g. before the velocity of the motor vehicle reduces to 0m/s.

A vehicle may comprise the above-mentioned assembly.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present invention, and to show more clearly how it may be carried into effect, reference will now be made, by way of example, to the accompanying drawings, in the drawings:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 4A:
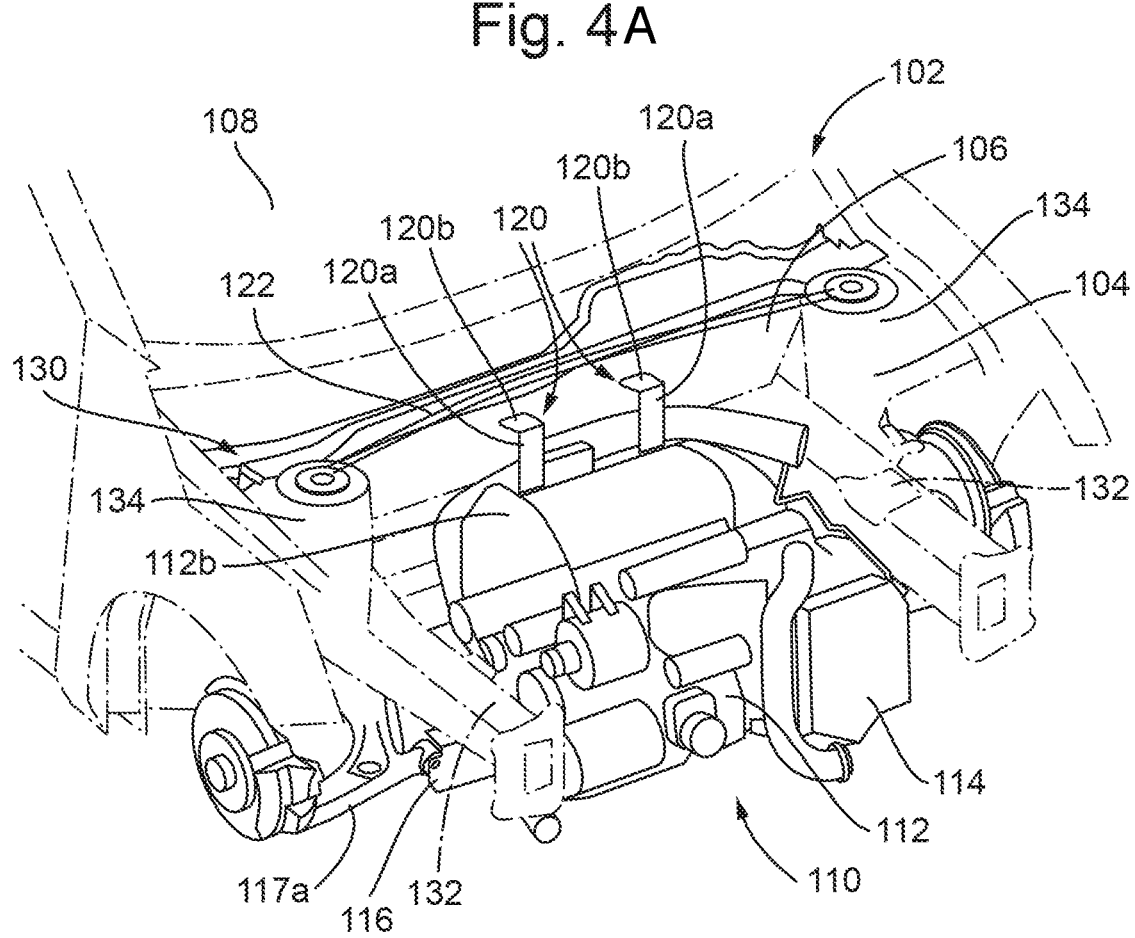
FIGS. 4A and 4B are perspective views of a vehicle according to arrangements of the present disclosure.
Figure 4B:
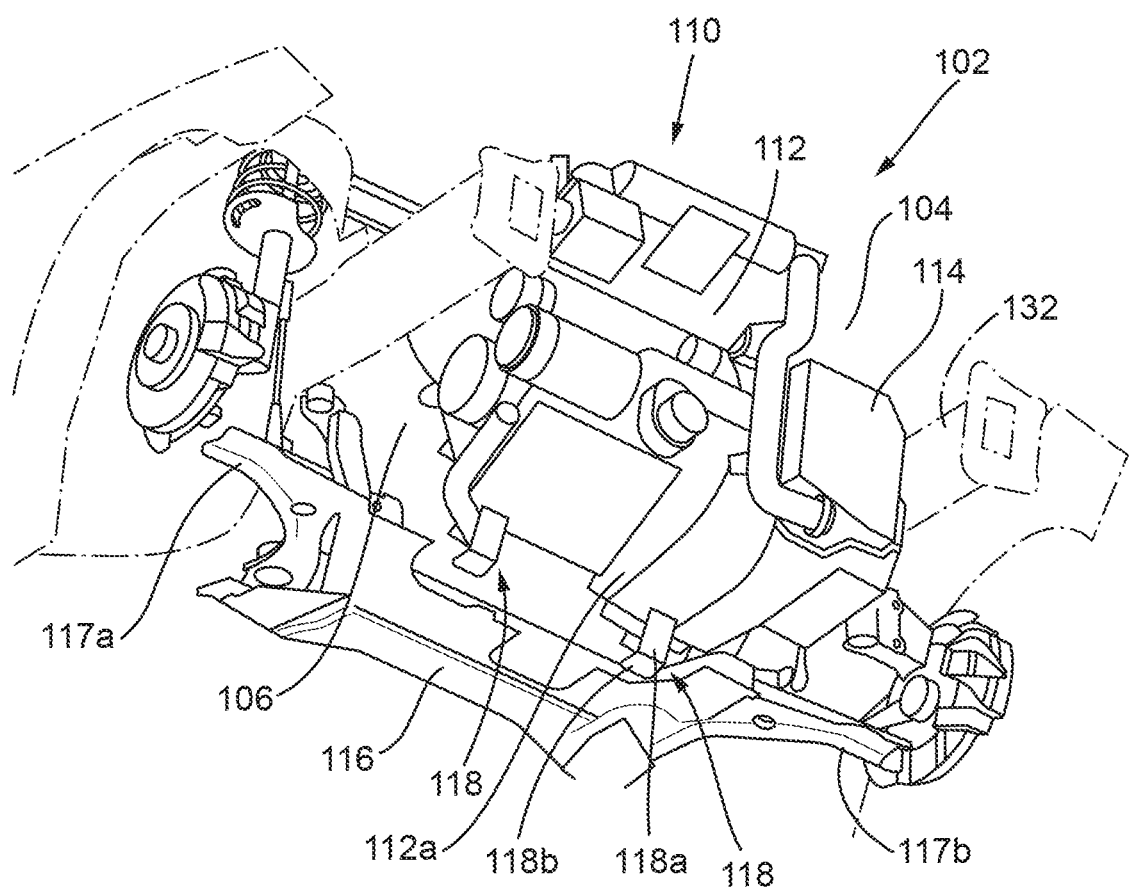

With reference to FIGS. 4A and 4B, a vehicle 102 according to the present disclosure comprises an engine assembly 110 provided within an engine compartment 104. A bulkhead structure 106, e.g. a dash panel, is provided to separate the engine compartment 104 from an interior 108 of the vehicle 102. The engine compartment 104, bulkhead structure 106 and interior 108 of the vehicle 102 may be similar to the engine compartment 4, bulkhead structure 6 and interior 8 of the previously proposed vehicle 2.

The engine assembly 110 is similar to the engine assembly 10 and comprises a transverse mounted engine 112 and a transmission 114, which are similar to the engine 12 and transmission. The features described above in relation to the engine assembly 10 and the vehicle 2 may apply equally to the engine assembly 110 and vehicle 102. For example, a subframe 116 of the vehicle 102 forms a laterally extending structural member that supports suspension arms 117a, 117b on either side of the vehicle.

The vehicle further comprises an engine support 132 coupled in a load-transferring manner to a support structure assembly 130 of the vehicle and configured to support the engine assembly 110 within the engine compartment 104. The support structure assembly 130 is a frame of the vehicle, such as a monocoque, chassis, integral frame/chassis or any other arrangement of support structure members. In the depicted embodiment, support structure assembly 130 includes left and right suspension towers 134. The engine support 132 comprises a pair of longitudinally extending rails that are laterally spaced apart. The engine assembly 110 may be supported between the rails.

The engine assembly 110 differs from the engine assembly 10 in that the engine assembly 110 further comprises one or more first (lower) catch hooks 118 and one or more second (upper) catch hooks 120. The first and second catch hooks 118, 120 are coupled in a load-transferring manner to the engine assembly 110. For example, the catch hooks may be welded to the engine assembly 110, e.g. to a housing of the engine 112, or coupled to the engine assembly 110 using fasteners, e.g. bolts and/or studs. Alternatively, the catch hooks 118, 120 may be coupled to the engine assembly using any other permanent or temporary fastening method.

The first and second catch hooks 118, 120 are coupled to the engine assembly 110 at vertically spaced apart locations. For example, as shown in FIGS. 4A and 4B, the first catch hooks are coupled to a lower surface 112a of the engine, and the second catch hooks are coupled to an upper surface 112b of the engine. The upper surface 112b is located at a higher position on the engine that the lower surface 112a when the engine assembly 110 is installed into the vehicle 102. As shown in FIG. 4A and 4B, the first and second hooks are configured to face the bulkhead structure 6.

In other arrangements of the disclosure, the second (upper) catch hooks 120 may be coupled to the engine at a lower position that the first (lower) catch hooks 118. Alternatively, the first and second catch hooks may be coupled to the same surface of the engine and/or at the same vertical position.

In the arrangement shown in FIGS. 4A and 4B, the engine assembly 110 comprises two first catch hooks 118 and two second catch hooks 120. However, it is equally envisaged that the engine assembly 110 may comprise one first catch hook 118 and/or one second catch hook 120. Alternatively, the engine assembly 110 may comprise more than two first catch hooks 118 and/or more than two second catch hooks 120. The numbers of first and second catch hooks may differ or may be the same.

When the engine assembly comprises more than one first catch hook, the first catch hooks 118 may be spaced apart from one another in a lateral direction of the vehicle 2. Similarly, when the engine assembly 110 comprises more than one second catch hook, the second catch hooks 120 may be spaced apart from one another in the lateral direction of the vehicle 2. In the particular arrangement shown, the second catch hooks 120 are coupled to the engine 112, whereas one of the first catch hooks 118 (toward the right side of the vehicle 102) is coupled to the engine 112 whilst the other first catch hook (toward the left side of the vehicle) is coupled to the transmission 114.

As depicted in FIG. 4A, the vehicle 102 further comprises a catch structure 122. The catch structure is coupled in a load-transferring manner to the support structure assembly 130 of the vehicle. In the arrangement shown, the catch structure 122 is coupled to the tops of suspension tower 134 of the support structure assembly 130. However, in other arrangements of the disclosure, the catch structure 122 may be coupled to other components of the vehicle support structure assembly 130.

The catch structure 122 may be elongate. For example, the catch structure may comprise a rod, tube or bar. Alternatively, the catch structure 122 may comprise a cable. As depicted in FIG. 4A, the catch structure is arranged to extend across the vehicle 102, e.g. across the engine compartment 104 of the vehicle, in the lateral direction of the vehicle. The catch structure 122 is coupled to the support structure assembly 130 at the longitudinal ends of the catch structure 122. In some arrangements, the catch structure may additionally be coupled to the support structure assembly 130 at intermediate positions between the longitudinal ends of the catch structure.

In the arrangement shown in FIG. 4A, the catch structure 122 is a dedicated catch structure. However, it is equally envisaged that in other arrangements the catch structure 112 may comprise a component provided as part of another system of the motor vehicle 102. For example, the catch structure 122 may be formed by a component of an auxiliary system of the vehicle, such as a Heating, Ventilation and Air Conditioning (HVAC) system. For example, the catch structure 122 may be formed by a heater plenum chamber of the HVAC system. When the catch structure 122 is provided as part of another system, the catch structure 122 may, or may not, be specifically configured to perform the functions of the catch structure described within the present specification. The catch structure 122 may otherwise by formed by a roll bar or a scuttle structure and the top of the bulkhead.

The shape of the first and second catch hooks 118, 120 is configured to facilitate their engagement with the subframe 116 and catch structure 112 respectively, as described with reference to FIG. 5 below. The catch hooks may, as shown in the disclosed embodiment, each comprise a first flange 118a, 120a and a second flange 118b, 120b. Respective first and second flanges are joined at an angle to one another.

Each of the catch hooks is coupled in a load-transferring manner to the engine assembly 110 at their respective first flange 118a, 120a. The first flange 118a, 120a may comprise a connecting portion configured to be coupled to the engine assembly 110. The first flanges 118a, 120a extend away from the engine assembly 110 in a substantially vertical direction. Alternatively, in some arrangements of the disclosure, the first flanges 118a, 120a may extend in a direction having a horizontal component, e.g. in a longitudinal and/or lateral direction of the vehicle 102.

The second flanges 118b, 120b may extend from the respective first flanges 118a, 120a at an angle relative to the first flange. In the arrangement depicted, the second flanges are arranged at right angles, e.g. at substantially 90 degrees, to the first flanges 118a, 120a. However, it is equally envisaged that the second flanges 118b, 120b may be arranged at any other angle relative to the first flanges 118a, 120a. The second flanges 118b, 120b of different ones of the first and second catch hooks 118, 120 may be arranged at different angles to other first and second catch hooks respectively. Furthermore, the second flanges 118b of the first catch hooks 118 may extend away from the first flanges 118a of the first catch hooks at different angles compared to the second flanges 120b of the second catch hooks 120. As depicted, the second flanges 118b, 120b typically extend from the first flange 118a, 120b in a direction towards the subframe 116 or catch structure 122.

In the arrangements shown in FIGS. 4A and 4B, the first catch hooks 118 are configured such that during a collision, the second flanges 118b of the catch hooks pass under the subframe 116 and the subframe contacts the first flange 118a. The subframe 116 then engages with the first catch hooks 118 to contact the first and second flanges 118a, 118b of the first catch hooks.

Similarly, the second catch hooks 120 are configured such that during a collision, the second flanges 120b of the catch hooks pass over the catch structure 122 and the catch structure contacts the first flange 120a of the catch hook. The catch structure 122 then engages with the second catch hooks to contact the first and second flanges 120a, 120b.

In other arrangements, the configuration, e.g. shape, of the subframe 116 and/or the catch structure 122 may differ, and hence, the configuration of the first and/or second catch hooks may differ accordingly. In general, the first and second catch hooks may be configured as desired in order to facilitate engagement of the first and second catch hooks with the subframe 116 and catch structure 122 respectively during a collision of the vehicle, as described below.

In the arrangement shown in FIGS. 4A and 4B the first and second catch hooks 118, 120 are dedicated components provided in the engine assembly 110 for the purpose of engaging the subframe 116 and catch structure 122 respectively during a collision of the vehicle. However, it is equally envisaged that in other arrangements of the vehicle, one or more of the first and second catch hooks 118, 120 may have a dual purpose, for example, the first and/or second catch hooks 118, 120 may be formed by lifting eyes provided on the engine 112. The engine 112 may be lifted at the lifting eyes when the engine is being installed into the vehicle 102.

Figure 5:
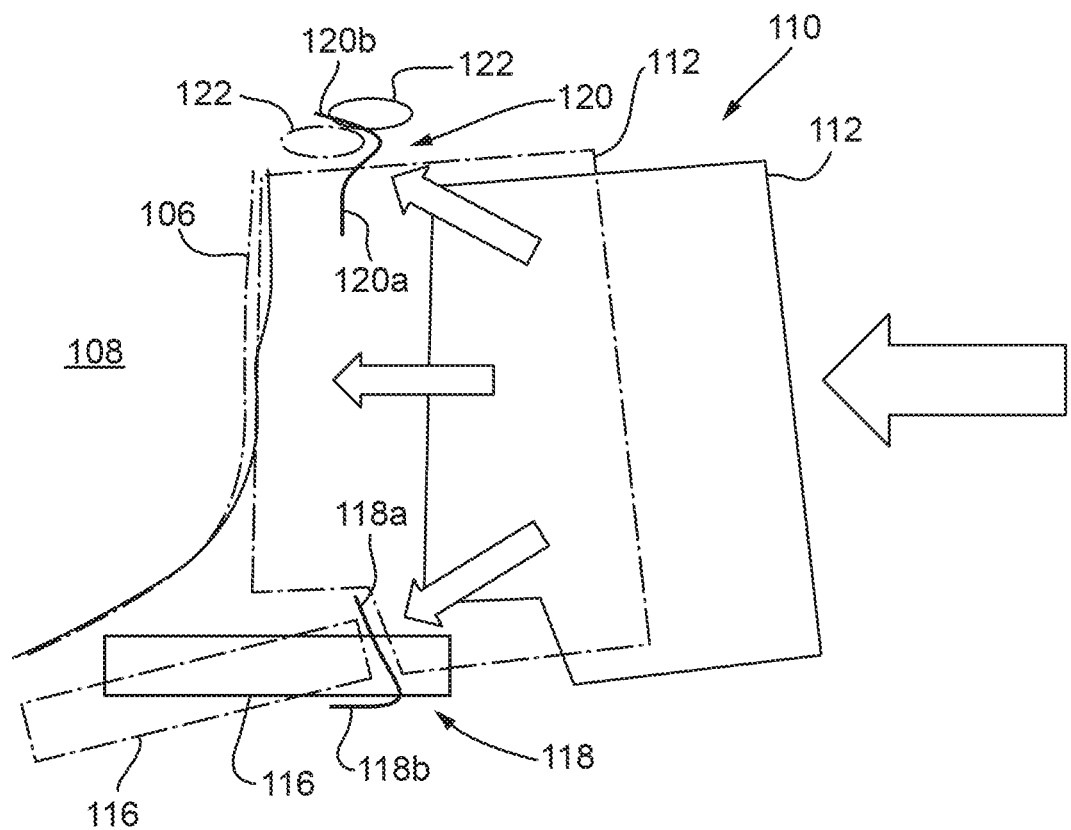
FIG. 5 is a schematic sectional view of the vehicle according to arrangements of the present disclosure showing the positions of components of the vehicle before and after a collision.

With reference to FIG. 5, during a collision, e.g. a frontal collision of the vehicle 102, the second catch hooks 120 engage the catch structure 122. The second catch hooks 120 and optionally the catch structure 122 are configured such that force is transferred from the engine into the catch structure 122 through the second catch hooks 120.

Similarly, the first catch hooks 118 engage the subframe 116 of the engine assembly 110 during the collision and transfer force from the engine 112 into the subframe. The subframe 116 is coupled in a load-transferring manner to the support structure assembly 130 and transfers the force into the support structure assembly 130 during the collision.

The catch structure 122 is spaced apart from the bulkhead structure 106 of the vehicle. As depicted in FIG. 5, the catch structure is positioned forwards of the bulkhead structure. The catch structure 122 and the second catch hooks 120 are preferably positioned such that the second catch hooks 120 engage the catch structure 122 before the engine 112 has moved sufficiently far rearward to contact the bulkhead structure 106 of the vehicle. Likewise, the first catch hooks 118 are preferably positioned such that the first catch hooks engage the subframe 116 before the engine 112 contacts the bulkhead structure 106.

The catch hooks 118, 120, catch structure 122 and subframe 116 provide load paths between the engine 112 and the vehicle support structure assembly 130 of a greater stiffness than the engine support 132. Hence, when the first and second catch hooks engage the subframe 116 and catch structure 122 respectively, the effective stiffness of the connections between the engine assembly 110 and the support structure assembly 130 is at least temporarily increased. By increasing the stiffness of these connections and improving the transfer of crash/impact load from the engine 112 to the support structure assembly 130, the deceleration of the motor vehicle 102 during the collision may also be at least temporarily increased.

Figure 1:
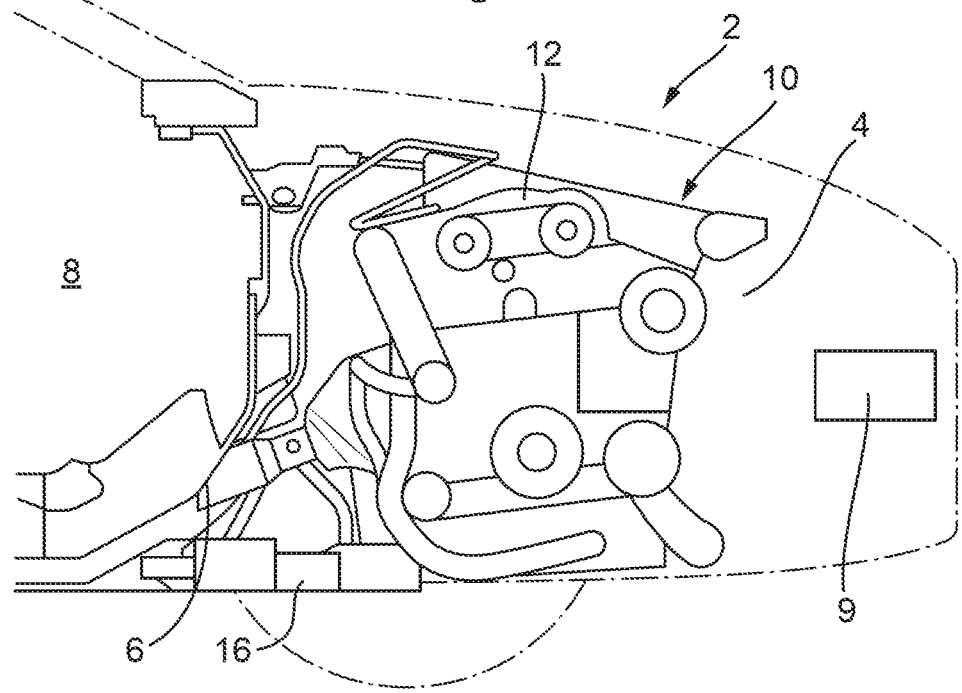
FIG. 1 is a side view of a vehicle according to the prior art.
Figure 2:
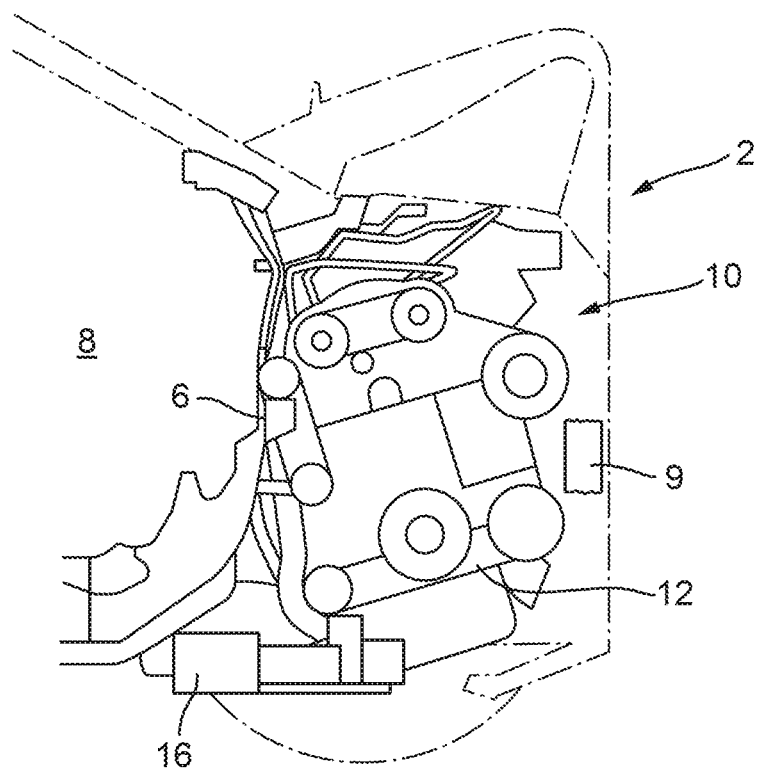
FIG. 2 is a side view of the prior art vehicle of FIG. 1 following a collision.
Figure 3:
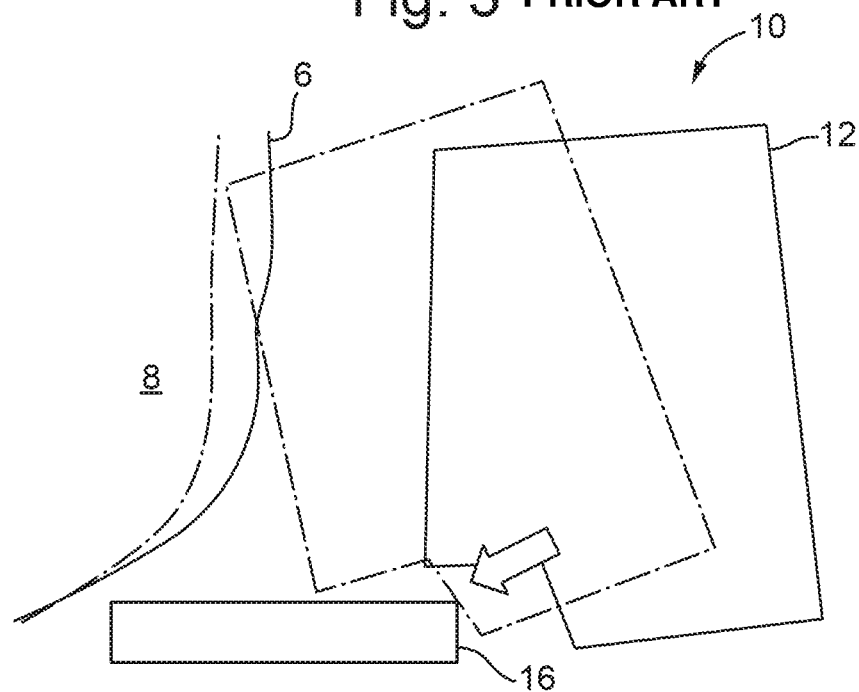
FIG. 3 is a schematic section view of the prior art vehicle showing the position on component of the vehicle before and after a collision.

Furthermore, by improving the transfer of load from the engine 112 to the support structure assembly 130, displacement of the engine 102 relative to the support structure assembly 130 can be limited, e.g. reduced, when compared to in the vehicle 2 shown in FIGS. 1 and 2. In particular, as shown in FIG. 5, displacement of the engine 112 is reduced, such that the deformation of the bulkhead structure 106 by the engine 112, and hence, penetration of the engine 112 into the interior 108 of the vehicle during the collision is reduced. In some arrangements, the second catch hooks 120 and optionally the catch structure 122 are configured such that the engine 112 does not contact the bulkhead structure before the catch structure has been deformed, as described below.

As mentioned above, the first and second catch hooks 118, 120 are coupled to the engine 112 at vertically spaced apart locations. However in other arrangements, the first and second catch hooks 118, 120 may be coupled to the engine at the same vertical position. In either arrangement, the first and second catch hooks 118, 120 are arranged such that hook portions, e.g. the second flanges 118b, 120b, of the first catch hooks 118 are vertically spaced apart from those of the second catch hooks 120. By configuring the first and second catch hooks in this way, when the first and second catch hooks 118, 120 engage the subframe 116 and catch structure 122 respectively, rotation of the engine assembly 110 about a lateral axis of the vehicle is restricted.

Additionally, by providing more than one first and/or second catch hook, that are laterally spaced apart from each other, rotation of the engine about a vertical axis is also restricted. In some arrangements, the first and second catch hooks 118, 120 may be positioned, e.g. in a longitudinal direction of the vehicle, such that the catch hooks 118, 120 engage the subframe 116 and catch structure 122 at different points during the collision, e.g. following different levels of displacement and/or rotation of the engine assembly 110. This allows the angle of the engine assembly 110 during the collision to be controlled. As shown in FIG. 5, controlling the angle of the engine assembly 110 may also allow the extent of penetrations of the engine into the interior 108 to be reduced.

The subframe 116 is coupled in a load-transferring manner to the support structure assembly 130 of the vehicle and initially transfers load from the engine into the support structure assembly 130. However, the subframe 116 and/or the support structure assembly 130 are configured such that when sufficient load is applied to the subframe 116, e.g. via the first catch hooks 118, the subframe 116 decouples from the support structure assembly 130. When this occurs, the stiffness of the connection between the subframe 116 and the support structure assembly 130 is reduced.

The term "decouple" as used herein is intended to indicate a complete or significant loss of load-transferring capability, and does not necessarily require a complete physical severing of physical connection.

In the arrangement shown in FIGS. 4A and 4B, the catch structure 122 is configured to deform during the collision. For example, the catch structure 122 may be configured to bend, buckle, rupture, and/or snap during the collision. Additionally or alternatively, the catch structure 122 may be configured to decouple from the support structure assembly 130, e.g. at one or more ends of the catch structure 122 during the collision. When the catch structure 122 deforms during the collision, the stiffness of the load path from the engine 112 to the support structure assembly 130 via the second catch hooks 120 may be reduced. Once the catch structure has completely, e.g. substantially completely, deformed, for example, when the catch structure snaps or ruptures, the load path between the engine 112 and the support structure assembly 130 through the second catch hooks and the catch structure 122 may be disrupted, e.g. disconnected.

Reducing the stiffness of the connections between the engine assembly 110 and the support structure assembly 130 at the first and second catch hooks 118, 120, may lead to an increase in deformation, e.g. buckling and/or crumpling, of the engine support 132. Reducing the stiffness of the connections may reduce the deceleration of the vehicle 102 during the collision. Additionally, reducing the stiffness of the connections may permit further displacement of the engine assembly 110 during the collision. Further displacement of the engine assembly 110 may lead to the engine contacting and/or deforming the bulkhead structure 106.

Figure 6:
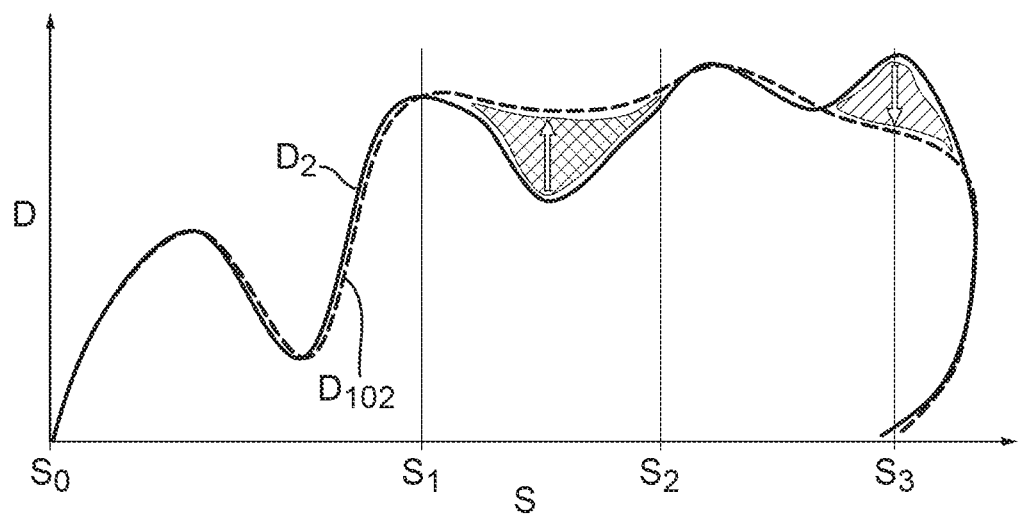
FIG. 6 shows a graph comparing deceleration of the previously proposed vehicle and the vehicle according to arrangements of the present disclosure during a collision.

With reference to FIG. 6, by controlling the point at which the first and second catch hooks 118, 120 engage the subframe 116 and catch structure 122 respectively, e.g. the amount that the engine support 132 crumples and/or the engine 112 displaces before the catch hooks 118, 120 have moved to engage the subframe 116 and catch structure 122, the deceleration of the motor vehicle during a collision can be controlled in a manner to make the deceleration more constant and avoid undesirable peaks.

In FIG. 6, the solid line $D_2$ shows the deceleration (D) of the previously proposed motor vehicle 2 during a collision, e.g. as a function of displacement (S) of the vehicle during the collision. As shown, the deceleration of the vehicle 2 varies during the collision as different crash structures of the vehicle 2 buckle or crumple and/or their stiffnesses vary.

The collision begins at a vehicle displacement $S_0$. Between displacements $S_0$ and $S_1$, crash structures of the vehicle 2, such as the front crash structure 9, crumple. The deceleration of the vehicle may increase as the stiffness of the crash structures increase and may reduce as other crash structures begin to buckle or crumple.

When the vehicle 2 has displaced to $S_1$, the engine 12 may be receiving force from the collision that may cause the engine support to buckle or crumple. As depicted in FIG. 6, the deceleration of the vehicle is reduced between vehicle displacements $S_1$ and $S_2$ as the engine support crumples. At vehicle displacement $S_3$, each of the crash structures of the vehicle may have crumpled and the deceleration of the vehicle 2 reaches a maximum.

In FIG. 6, the deceleration of the vehicle 102 during an equivalent collision is shown as a dashed line $D_{102}$ for comparison with the deceleration of the previously proposed vehicle 2. As described above, when the first and second catch hooks 118, 120 engage the subframe 116 and catch structure 122 respectively, the stiffness of connections between the engine assembly 110 and the support structure assembly 130 may be increased, which may affect the deceleration of the motor vehicle 102. The point, e.g. the level of vehicle or engine displacement, at which the first and second catch hooks 118, 120 engage the subframe 116 and catch structure 122 may be controlled in order to adjust the deceleration of the vehicle during the collision as desired, e.g. at a desired point during the collision.

In the arrangement depicted, the catch hooks 118, 120 are configured to engage the subframe 116 and catch structure 122 at or around vehicle displacement $S_1$. As described above, providing the load path to the support structure assembly 130 via the catch hooks 118, 120 reduces the amount that the engine support 132 is crushed and/or that the engine 112 displaces and increases the effective stiffness of the connections between the engine assembly 110 and the support structure assembly 130. Hence, as shown in FIG. 6, the deceleration of the vehicle 102 is not significantly reduced between $S_1$ and $S_2$. In particular, the deceleration of the vehicle is reduced less than the deceleration of the previously proposed vehicle 2 during the same stage of the collision.

Between $S_2$ and $S_3$, the force of the collision being transferred into the support structure assembly 130 through the subframe 116 may reach a sufficient magnitude to decouple the subframe 116 from the support structure assembly 130. Decoupling of the subframe 116 from the support structure assembly 130 reduces the effective stiffness of the connections between the engine assembly 110 and the support structure assembly 130, which may reduce the deceleration of the vehicle 102

Additionally or alternatively, the catch structure 122 may be configured to deform, e.g. bend, buckle, break, e.g. snap or rupture, or decouple from the support structure assembly 130, between $S_2$ and $S_3$. Deformation of the catch structure 122 also reduces the effective stiffness of the connections between the engine assembly 110 and the support structure assembly 130.

In some arrangements, the catch structure 122 is configured to deform at substantially the same point in the collision that the subframe 116 decouples from the support structure. The point at which the catch structure 122 deforms relative to the point at which the subframe 116 decouples may be selected in order to allow or encourage rotation of the engine about a lateral axis of the vehicle 102 in a preferred direction by a desired amount, or to limit such rotation.

When the subframe has become decoupled and/or the catch structure has deformed, an increased level of load from the collision may be transferred to the support structure assembly 130 through the engine support 132. The engine support 132 may buckle or crumple and the effective stiffness of the connections between the engine assembly 110 and the support structure assembly 130 may be reduced.

As shown in FIG. 6, the reduced stiffness of the connections between the engine assembly 110 and the support structure assembly 130 and/or the crumpling of the engine support 132 reduces the magnitude of deceleration experienced at point $S_3$ and also reduces the peak magnitude of deceleration during the collision. It is therefore desirable for the catch structure 122 to become deformed, e.g. substantially fully deformed, during the collision before the vehicle has come to a stop, e.g. when a speed of the vehicle is above a threshold value. In this way, the peak deceleration experienced by passengers of the vehicle during the collision can be reduced.

Although the Figures and description given above illustrate and describe an arrangement in which the engine is a front mounted engine, and the collision is a frontal collision of the vehicle, it is equally envisaged, that the present invention may be applied to vehicle having a rear mounted engine, and the first and second catch hooks 118, 120 and catch structure may be configured as appropriate to limit forward displacement of the engine during a rear collision of the vehicle. For example, the catch structure 122 may be arranged forward of the catch hooks 118, 120.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A motor vehicle comprising:
   an engine assembly housed in a bay;
   a subframe adjacent a bottom of the bay;
   a bulkhead adjacent a rear of the bay;
   a catch structure extending laterally across the bay above the subframe and adjacent an upper end of the bulkhead;
   a lower catch hook coupled to the engine assembly and configured to engage the subframe and transfer load from the engine assembly to the subframe when the engine assembly moves toward the bulkhead during a collision; and
   an upper catch hook coupled to the engine assembly and configured to engage the catch structure and transfer load from the engine assembly to the catch structure when the engine assembly moves toward the bulkhead during the collision.

2. The motor vehicle of claim 1, wherein the catch structure is configured to deform during the collision from a first state wherein the transfer of load from the engine assembly to the catch structure limits movement of the engine assembly relative to the bulkhead, to a second state wherein the transfer of load from the engine assembly to the catch structure is reduced in comparison to the first state.

3. The motor vehicle of claim 2, wherein the catch structure is configured to deform from the first state to the second state before the engine assembly contacts the bulkhead.

4. The motor vehicle of claim 1, further comprising left and right suspension towers, and wherein the catch structure is coupled to the suspension towers to transfer load thereto.

5. The motor vehicle of claim 1, further comprising a support structure of the vehicle to which the catch structure is coupled, and wherein the catch structure is configured to decouple from the support structure during the collision as a result of the load transferred to the catch structure by the upper catch hook.

6. The motor vehicle of claim 1, further comprising a support structure of the vehicle to which the subframe is coupled, and wherein the subframe is configured to decouple from the support structure during the collision as a result of the load transferred to the subframe by the lower catch hook.

7. The motor vehicle of claim 1, further comprising a support structure of the vehicle to which the catch structure and the subframe are coupled, and wherein:
   the catch structure is configured to decouple from the support structure during the collision as a result of the load transferred to the catch structure by the upper catch hook;
   the subframe is configured to decouple from the support structure during the collision as a result of the load transferred to the subframe by the lower catch hook; and
   the catch structure is configured to decouple from the support structure at a level of engine displacement substantially equal to that at which the subframe decouples from the support structure.

8. The motor vehicle of claim 1, wherein the catch structure comprises a cable opposite ends of which are coupled to a support structure of the vehicle.

9. The motor vehicle of claim 1, wherein the catch structure is arranged to be engaged by the lower catch hook prior to the engine assembly contacting the bulkhead.

10. A motor vehicle comprising:
    an engine assembly in a bay;
    a subframe adjacent a bottom of the bay;
    a catch structure extending laterally across the bay above the subframe;
    a lower hook coupled to the engine assembly and configured to engage and transfer loads to the subframe during a collision; and
    an upper hook coupled to the engine assembly and configured to engage and transfer loads to the catch structure during the collision.

11. The motor vehicle of claim 10, wherein the catch structure is configured to deform during the collision from a first state wherein the transfer of load from the engine assembly to the catch structure limits movement of the engine assembly within the bay, to a second state wherein the transfer of load from the engine assembly to the catch structure is reduced in comparison to the first state.

12. The motor vehicle of claim 11, further comprising a bulkhead adjacent a rear of the bay, and wherein the catch structure is configured to deform from the first state to the second state before the engine assembly contacts the bulkhead.

13. The motor vehicle of claim 10, further comprising left and right suspension towers, and wherein the catch structure is coupled to the suspension towers to transfer load thereto.

14. The motor vehicle of claim 10, further comprising a support structure of the vehicle to which the catch structure is coupled, and wherein the catch structure is configured to decouple from the support structure during the collision as a result of the load transferred to the catch structure by the upper catch hook.

15. The motor vehicle of claim 10, wherein the catch structure comprises a cable opposite ends of which are coupled to a support structure of the vehicle.

16. A motor vehicle comprising:
    an engine assembly in a bay;
    a subframe;
    a catch structure extending across the bay above the subframe;
    a lower hook extending from the engine assembly to engage and transfer loads to the subframe during a collision; and
    an upper hook extending from the engine assembly to engage and transfer loads to the catch structure during the collision.

17. The motor vehicle of claim 16, wherein the catch structure is configured to deform during the collision from a first state wherein the transfer of load from the engine assembly to the catch structure limits movement of the engine assembly within the bay, to a second state wherein the transfer of load from the engine assembly to the catch structure is reduced in comparison to the first state.

18. The motor vehicle of claim 17, further comprising a bulkhead adjacent a rear of the bay, wherein the catch structure is configured to deform from the first state to the second state before the engine assembly contacts the bulkhead.

19. The motor vehicle of claim 16, further comprising left and right suspension towers, and wherein the catch structure is coupled to the suspension towers to transfer load thereto.

20. The motor vehicle of claim 16, further comprising a support structure of the vehicle to which the catch structure is coupled, and wherein the catch structure is configured to decouple from the support structure during the collision as a result of the load transferred to the catch structure by the upper catch hook.

\* \* \* \* \*